F. P. MURPHEY.
VALVE MECHANISM FOR CORN PLANTERS.
APPLICATION FILED APR. 13, 1909.
943,441.
Patented Dec. 14, 1909.
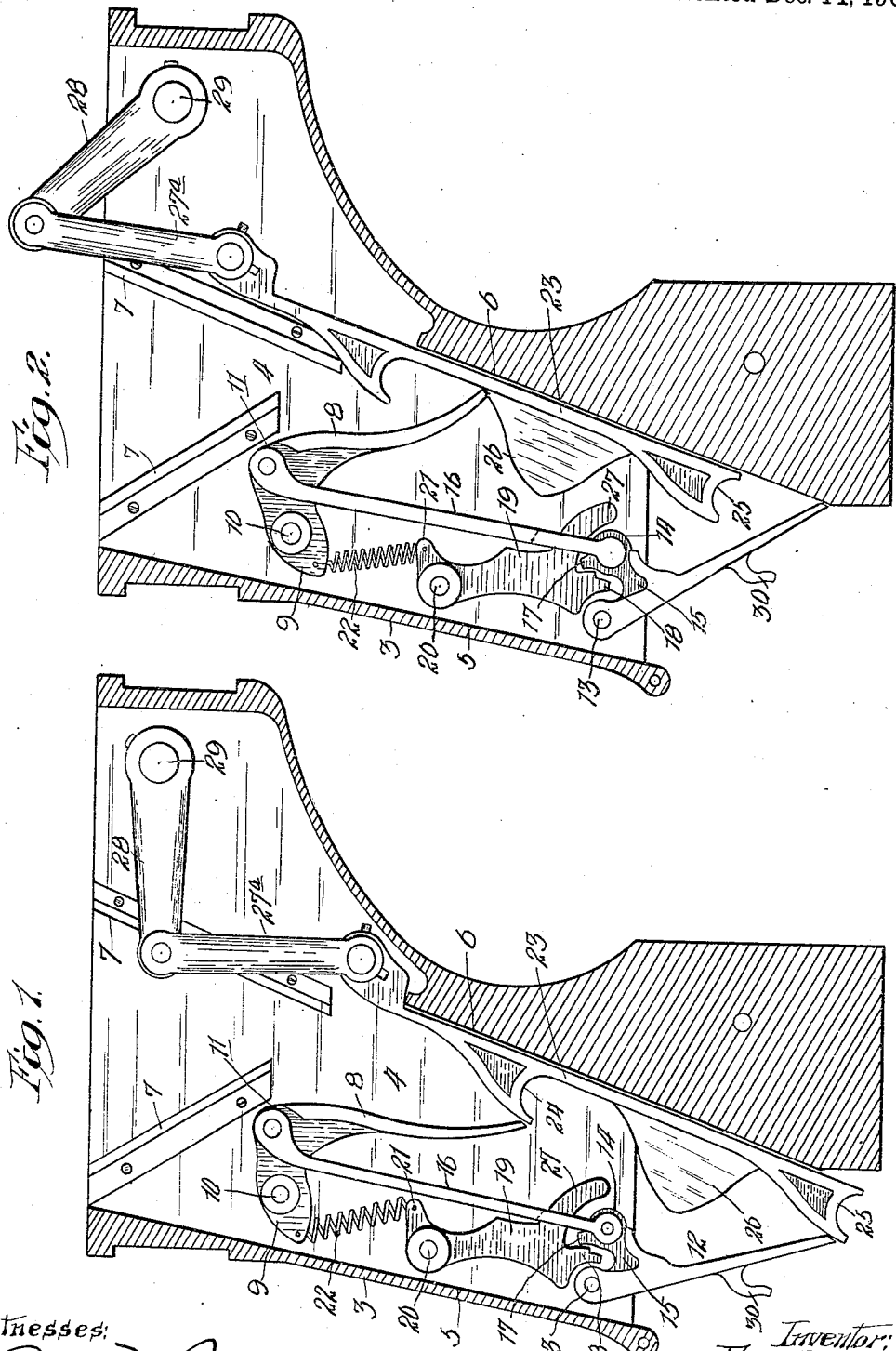

UNITED STATES PATENT OFFICE.

FRANK P. MURPHEY, OF DECATUR, ILLINOIS.

VALVE MECHANISM FOR CORN-PLANTERS.

943,441.  Specification of Letters Patent.  Patented Dec. 14, 1909.

Application filed April 13, 1909. Serial No. 489,679.

*To all whom it may concern:*

Be it known that I, FRANK P. MURPHEY, a citizen of the United States, residing at Decatur, in the county of Macon and State of Illinois, have invented certain new and useful Improvements in Valve Mechanism for Corn-Planters, of which the following is a specification.

The valve mechanism of this invention is of the type which employs an intermediate valve gate and a discharging valve gate for intermittently feeding down the required number of kernels of corn or other grain to the point of discharge.

The present invention relates particularly to the means employed for connecting the two valve gates in order to enable them to operate in unison; and to the means provided for locking both of the valve gates in a non-operative position when it is desired to use the machine for drilling.

The invention further relates to the means provided for releasing the gates from their nonoperative position with the first stroke of the plunger when the machine is again operated as a planter in connection with a check row wire.

Further objects will appear from a detailed description of the invention, which consists in the features of construction and combination of parts hereinafter described and claimed.

In the drawings Figure 1 is a sectional elevation of the valve mechanism in discharging position; and Fig. 2 a similar view of the mechanism in closed position.

The mechanism is located within a chute 3 having side walls 4, and cross walls 5 and 6 respectively. The chute is provided, near its mouth, with a pair of converging guide plates 7, which feed the kernels of grain down onto the intermediate gate 8, which is of substantially inverted L shape having an angularly disposed arm 9 through which is entered a pivot pin 10 at a point considerably to the rear of the angle or elbow 11 of the gate. The intermediate valve gate coöperates with a discharging valve gate 12, which is hung from a pivot pin 13 near the lower end of the chute, and is provided, near its upper or pivoted end, with a forwardly projecting tongue 14 which is recessed on the side 15 to receive a connecting link 16, which is pivoted at its lower end to the tongue 14 on the discharging gate, and is pivoted to the upper or intermediate gate at a point adjacent to the elbow 11. The tongue 15 is provided with an upwardly projecting lug 17 which is adapted to engage with a notched finger 18, which depends from a locking lever 19, hung from a pin 20 located about midway between the pivotal pins 10 and 13. The locking lever, at its upper end, is provided with a finger 21, to which is secured the lower end of a coil spring 22, the upper end of which is entered into the end of the arm 9 on the intermediate gate, the construction being such that the tension of the spring serves to normally throw the intermediate valve gate into the position shown in Fig. 2, which action of the spring is transmitted to the discharging valve gate through the medium of the connecting link 16.

The valve gates coöperate with a plunger 23 provided with shoulders 24 and 25, which are adapted to force down the kernels of grain retained by the ends of the valve gates, the upper of which bears directly against the plunger at all times, and the lower of which bears against the wall 6 of the chute when in closed position, as shown in Fig. 2. The plunger is further provided with a cam lug 26, which is adapted to engage a prong 27, which forwardly projects from the locking arm 19 when the parts are thrown into locking position. The upper end of the plunger has pivoted thereto a link 27$^a$, which is adapted to be actuated by an arm 28 on a shaft 29, which latter is actuated by suitable mechanism.

In use, with the parts in the position shown in Fig. 2, one or more kernels discharged into the chute will initially lodge at the lower or free end of the intermediate valve gate and be there retained until the descent of the plunger brings the shoulder 24 into engagement with the valve gate, after which a continued movement of the plunger throws back the valve gate into the position shown in Fig. 1, allowing the shoulder 24 to carry down the kernel or kernels of grain which are then caught and retained by the discharging valve gate, so that with the retraction of the plunger said kernel or kernels will be lodged at the lower end of the discharging gate to be thereafter discharged by the next movement of the plunger. The two valve gates will move in unison, and when it is desired to throw the valve gates out of commission in order to permit the plunger to be used for drilling, the discharging valve gate is thrown back by a hook 30, which can be readily engaged by the finger until the end of the lug 17 engages the notch in the finger 18, which movement of the parts will throw the prong 27 forward to a position in which it will be engaged by the cam lug 26 with the next descent of the plunger. With the parts in this position, the drilling can continue until such time as it is desirable to employ the machine in connection with a check row wire. With the first movement of the plunger, actuated by a knot in the check row wire, the cam lug 26 will strike the prong 27 and retract the locking arm 19 sufficiently to release the lug 17 from engagement with the notched finger 18, thereby allowing the valve gates to spring back into operative position without manipulation or adjustment on the part of the operator. The arrangement is one which enables a single spring 22 to exert the necessary tension to maintain both of the valve gates in operative position when the gates are thrown into commission, and to hold the lugs 17 in engagement with the notched finger 18 when the valve gates are thrown out of commission, thereby materially simplifying the device as a whole.

What I regard as new and desire to secure by Letters Patent is:

1. In valve mechanism for corn planters, the combination of a chute, two valve gates pivoted within the chute, a plunger adapted to coöperate with said valve gates in discharging grain retained thereby, a connection between said valve gates for operating them in unison, a pivoted locking lever adapted to engage one of the valve gates and hold it in non-operative position, a spring connecting the locking lever with the other valve gate for normally holding both of the valve gates in closed position, and a lug on the plunger adapted to engage the locking lever and throw it to a position to release the locked valve gate, substantially as described.

2. In valve mechanism for corn planters, the combination of a chute, an intermediate valve gate of inverted L formation and pivoted to the chute through its short arm, a discharging valve gate, a link connecting the discharging valve gate with the elbow of the intermediate valve gate, a pivoted locking lever adapted to lock the discharging valve gate and hold both valve gates out of commission, a spring connecting the rear or nonacting end of the intermediate valve gate with the locking lever for normally holding the valve gates in closed position, and a plunger coacting with the valve gates, substantially as described.

3. In valve mechanism for corn planters, the combination of a chute, an intermediate valve gate of inverted L formation and pivoted to the chute through its short arm, a discharging valve gate, a link connecting the discharging valve gate with the elbow of the intermediate valve gate, a pivoted locking lever adapted to lock the discharging valve gate and hold both valve gates out of commission, a spring connecting the rear or nonacting end of the intermediate valve gate with the locking lever for normally holding the valve gates in closed position, a plunger coacting with the valve gates, and provided with a lug adapted to engage the locking lever when in locking position and throw it to a position to release the engaged valve gate, substantially as described.

4. In valve mechanism for corn planters, a valve gate, a pivoted locking lever adjacent thereto and adapted to engage and hold the valve gate out of commission, a spring and connections between the locking lever and the valve gate for normally holding the valve gate closed, a plunger coacting with the valve gate and provided with a lug adapted to engage the locking lever when in locking position and throw back said lever and release the gate, substantially as described.

5. In valve mechanism for corn planters, the combination of a chute, an intermediate lever pivoted within the chute and provided with an arm projecting rearwardly of the pivotal point, a discharging valve gate pivoted to the chute and provided with a tongue extending forwardly of the pivotal point, a link connecting both of the valve gates forwardly of their pivotal points, a locking lever adapted to engage and lock the discharging gate when thrown to non-operative position, and a spring connecting the locking lever with the arm on the intermediate gate to the rear of its pivotal point, substantially as described.

6. In valve mechanism for corn planters, the combination of a chute, an intermediate lever pivoted within the chute and provided with an arm projecting rearwardly of the pivotal point, a discharging valve gate pivoted to the chute and provided with a tongue extending forwardly of the pivotal point, a link connecting both of the valve gates forwardly of their pivotal points, a locking lever adapted to engage and lock the discharging gate when thrown to non-operative position, a spring connecting the locking lever with the arm on the intermediate gate to the rear of the pivotal point, a plunger coacting with the valve gates, and a lug on the plunger adapted to engage and release the locking lever when thrown to locking position, substantially as described.

FRANK P. MURPHEY.

Witnesses:
J. H. HALL,
E. K. HALL.